No. 895,267. PATENTED AUG. 4, 1908.
E. B. HESS.
WRITING MACHINE.
APPLICATION FILED FEB. 8, 1906.

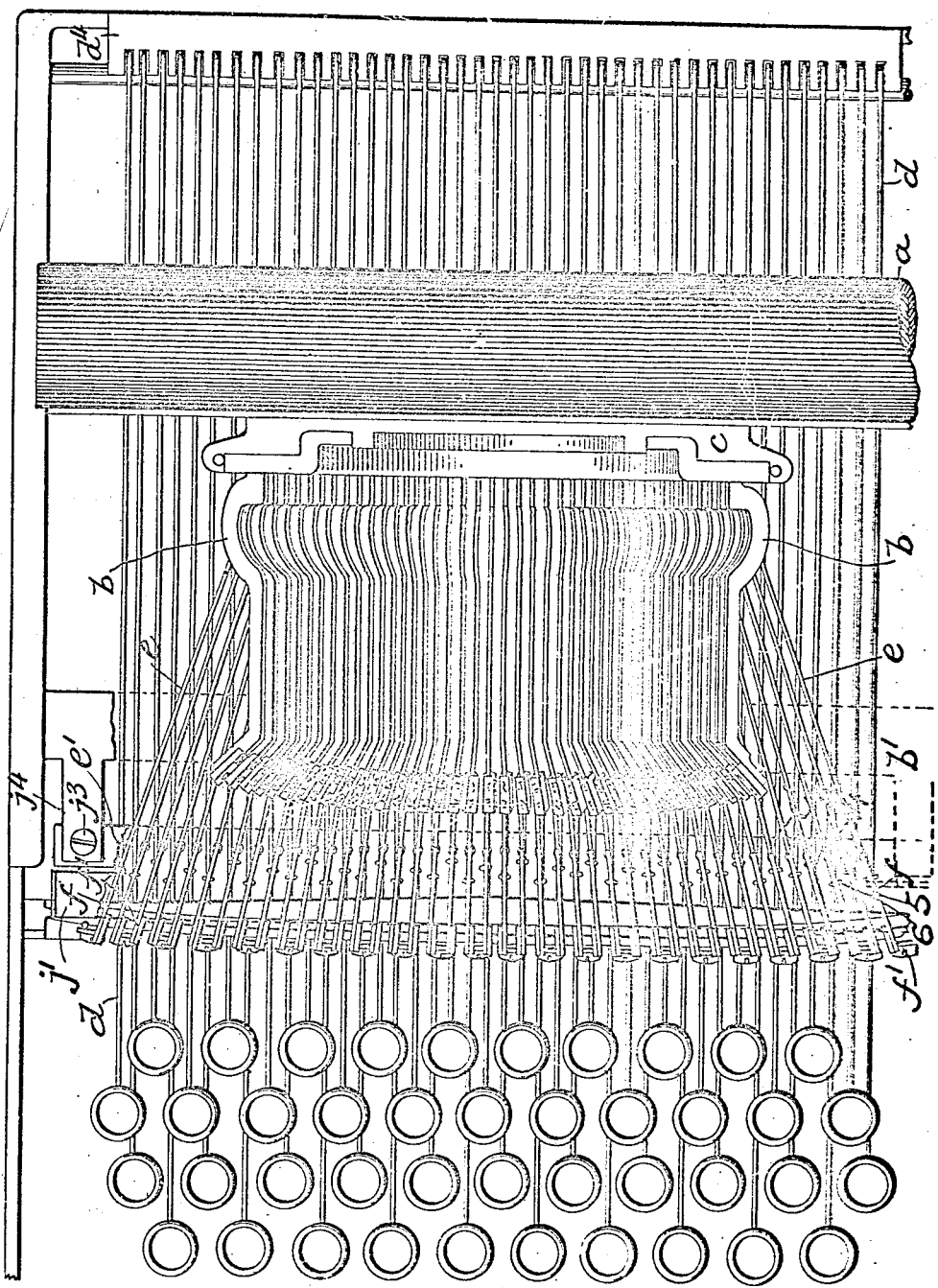

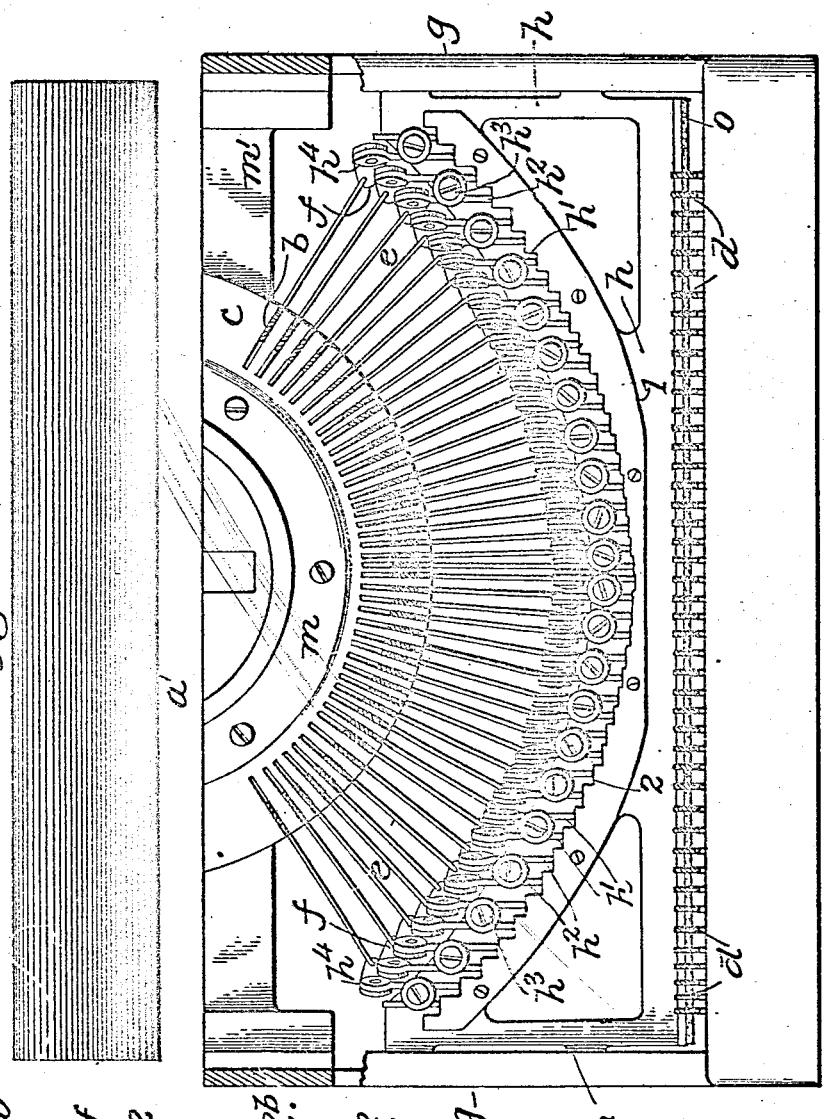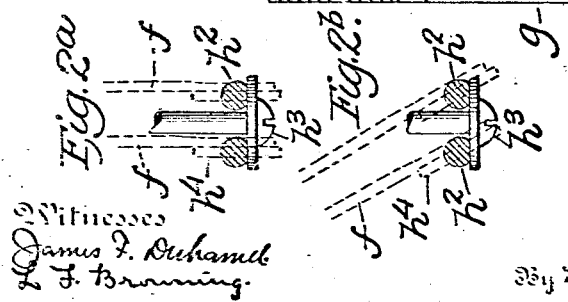

7 SHEETS—SHEET 3.

WITNESSES:
James T. Duhamel
L. F. Browning

INVENTOR:
Edward B. Hess
By his Attorney
Edward C. Davidson

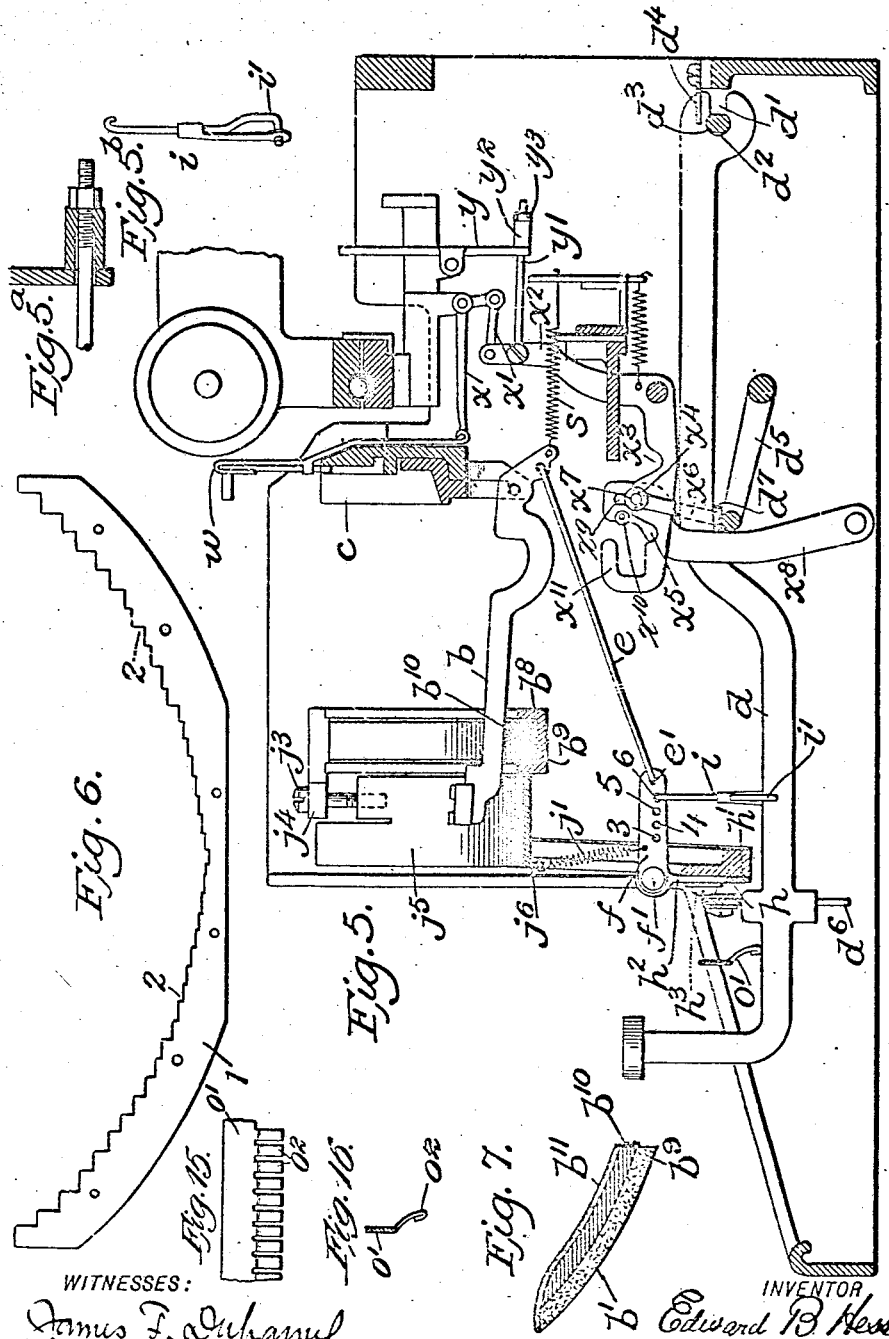

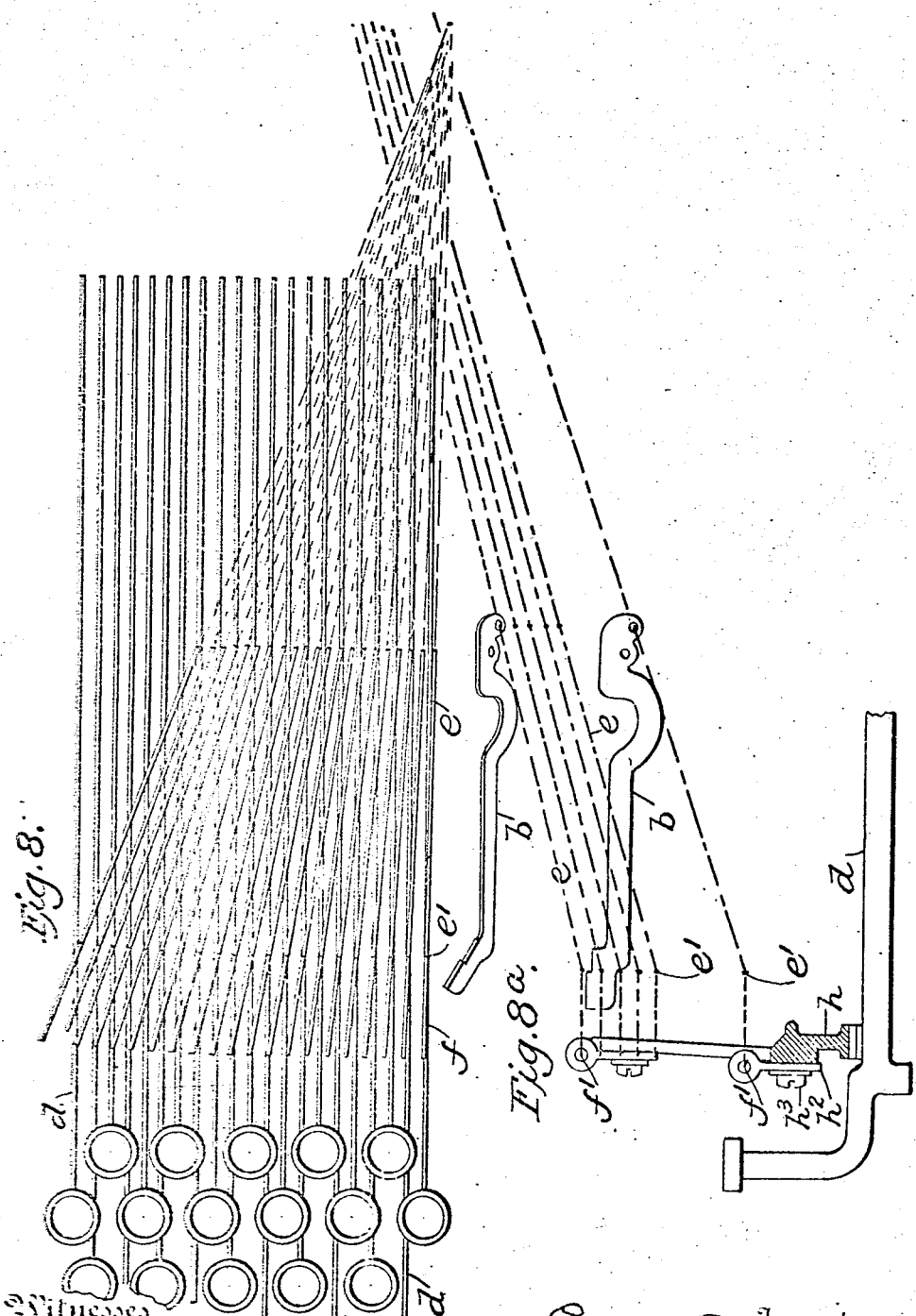

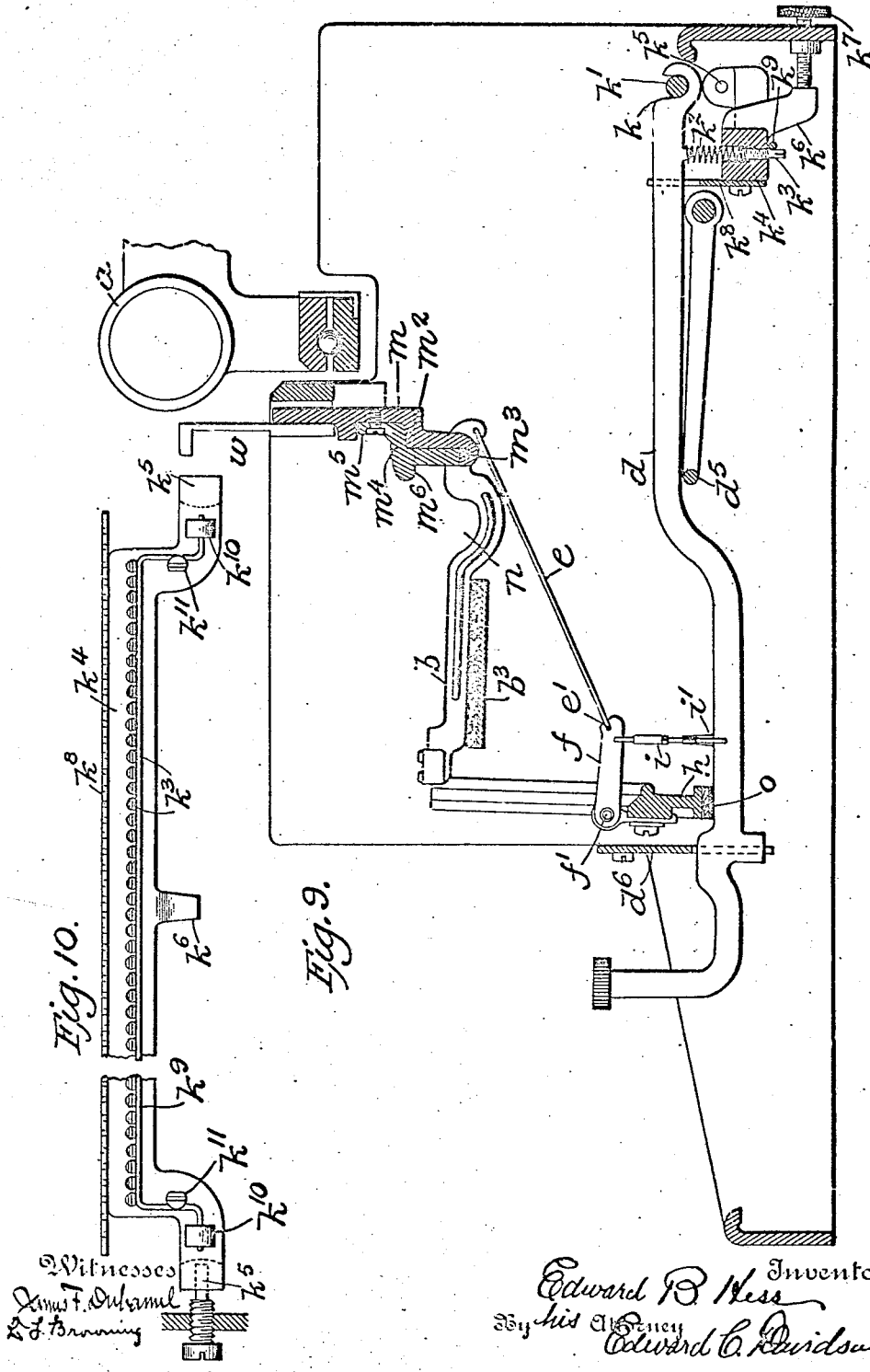

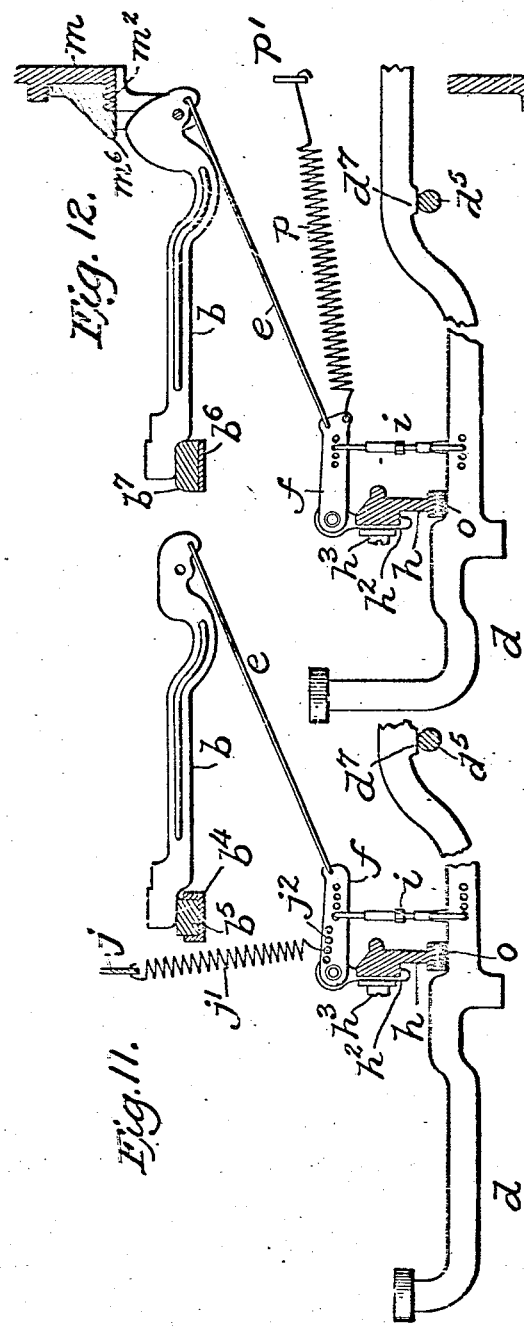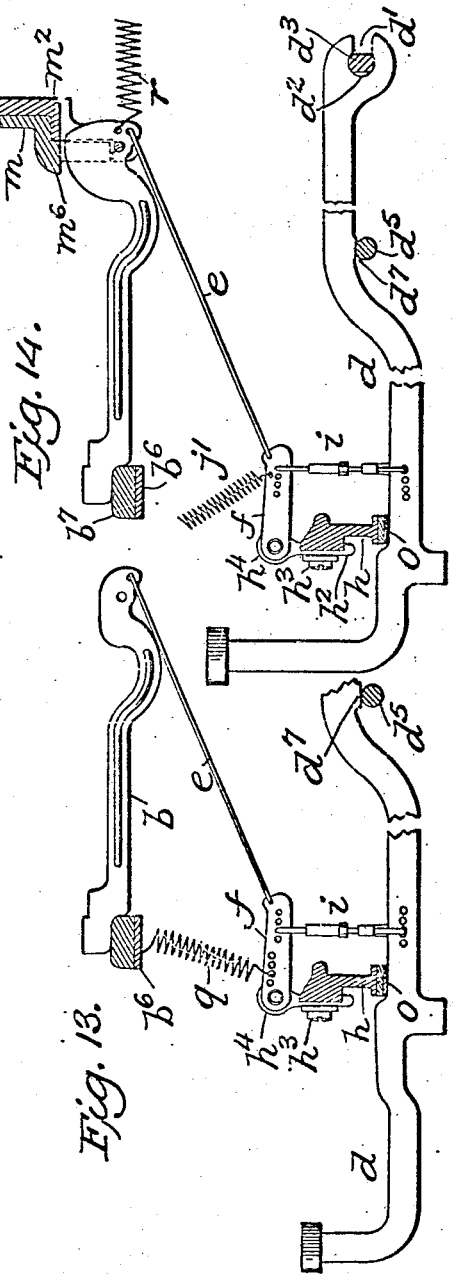

UNITED STATES PATENT OFFICE.

EDWARD B. HESS, OF NEW YORK, N. Y., ASSIGNOR TO ROYAL TYPEWRITER COMPANY, OF HOBOKEN, NEW JERSEY, A CORPORATION OF NEW JERSEY.

WRITING-MACHINE.

No. 895,267.　　　　Specification of Letters Patent.　　　　Patented Aug. 4, 1908.

Application filed February 8, 1906. Serial No. 309,039.

*To all whom it may concern:*

Be it known that I, EDWARD B. HESS, a citizen of the United States, residing in the borough of Brooklyn, city and State of New York, have invented certain new and useful Improvements in Writing-Machines, of which the following is a specification.

This invention primarily relates to a visible writing machine in which type-bars, pivoted in a segment below the platen, are actuated by flexing connections extending from them forward to fixed points and having, when flexed, the accelerating action of a reverse or breaking toggle. Typewriting machines of this general character are shown in U. S. Letters Patent, granted to me, No. 700,687, dated May 20, 1902; and in pending applications filed by me.

Among the objects of the invention are to provide for actuation of the respective type-bars by a direct pull in the vertical plane of a straight line extending from the heel of a type bar to the fixed point to which its flexing connection is attached; to so organize the machine that corresponding parts of all of the flexing type-bar actuating devices shall be of equal length and like construction: to afford substantially equal touch, and uniform depth of depression of all the key lever finger pieces, to which end the invention comprises a new scheme of connection of the key-levers to the type-bar actuating devices: to provide new means of application of reaction springs to the key-levers, affording individual and gang adjustment of the springs: and to improve the construction and arrangement of the type-bar segment. These and other important features of this invention, are hereinafter fully set forth.

The drawings show so much of a writing machine as is deemed desirable to illustrate the invention.

Figure 3:
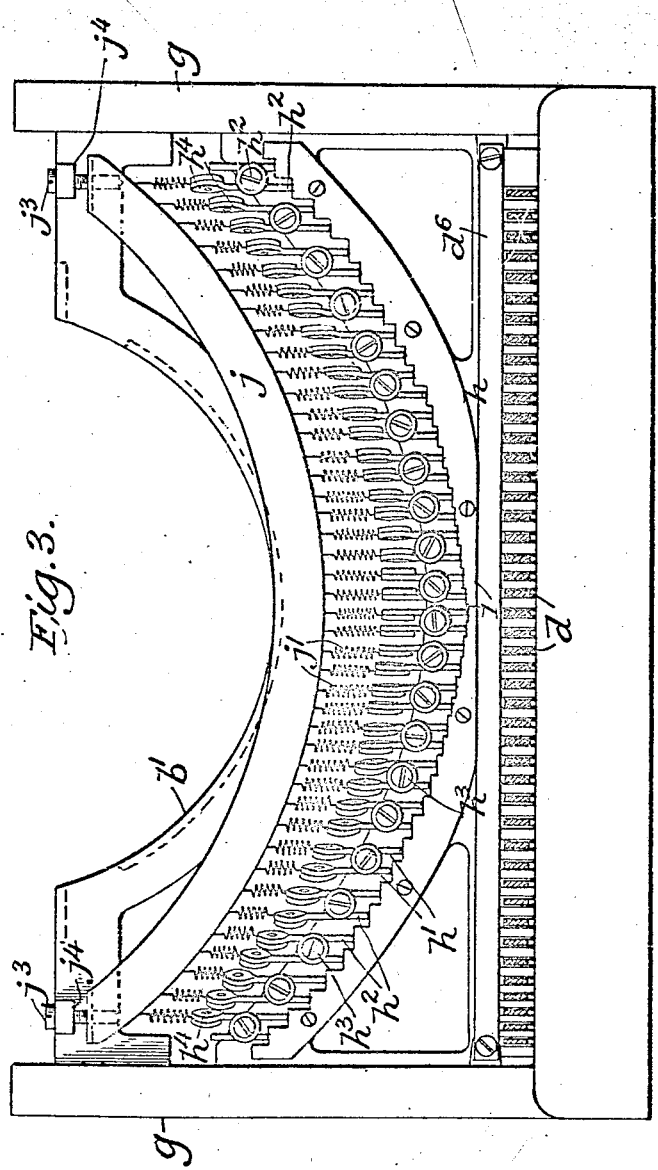
Figure 4:
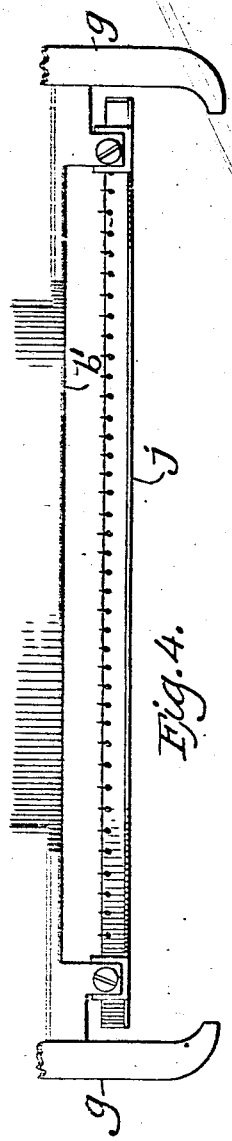

Figure 1, is a plan view, certain parts pertaining to this invention being omitted: Fig. 2, a front elevation, with the key-levers and type bars in section, intended to show more particularly the arrangement of type-bar operating devices: Figs. 2$^a$ and 2$^b$ are enlarged detail views indicating devices for clamping the anchor or pivot pieces of the several type-bar actuating connections: Fig. 3, a view similar to Fig. 2, omitting the type bar, showing a special arrangement (shown also in Fig. 1) of the reaction springs to the type-bar actuating devices: Fig. 4, a detail plan view showing the segmental head-rest upon which the type bars lie when in normal inactive position, and a special form of segmental plate to which all the reaction springs are attached: Fig. 5, a longitudinal section through the machine, showing, however, only a center key-lever and its type bar: Fig. 5$^a$ is an enlarged detail view showing a way of connecting the rocking escapement plate with its operating device: Fig. 5$^b$, is an enlarged view of a special form of snap-hook that may be used as the link for connecting the type-bar actuating connection with its key-lever: Fig. 6, an elevation of a stepped plate applied at the front of the machine forming bottom stops for the pins to which are connected the front ends of the type-bar actuating links: Fig. 7, a detail sectional view of the head rest of the type-bars: Fig. 8, a diagrammatic view, showing in plan the convergent arrangement of the jointed type-bar actuating links: and Fig. 8$^a$ a diagrammatic view in longitudinal sectional elevation taken at the center of the machine showing how, in the organization illustrated, the operating links converge upon lines meeting at a focus beyond that shown in Fig. 5; Fig. 9, a vertical longitudinal sectional view, similar to Fig. 5, showing some modifications: Fig. 10, a plan view of an adjustable rocking bar, at the rear of the machine, carrying the key-lever springs: Fig. 11, a detail elevation showing a single type-bar, its operating devices, and key-lever having a finger piece in the first or front row of the bank of finger pieces forming the keyboard: Fig. 12, a similar view showing a key-lever whose finger-piece belongs in the second row: Fig. 13, a similar view showing a key-lever whose finger-piece belongs in the third row: Fig. 14, a similar view showing a key-lever whose finger piece belongs in the fourth or rear row. Figs. 15 and 16 are detail views showing a comb plate for limiting upward movement of the key levers.

$a$ is the platen, $b$ type-bars pivoted in a segment $c$, of a construction hereinafter described, and $d$ are the key-levers. The type-bars normally lie toward the front of the machine upon a back-stop or rest $b'$ of novel construction hereinafter described. To the heel of each type-bar is jointed a forwardly extending link $e$ jointed at its front end, at $e'$, to the rear end of a shorter front link $f$ rocking about an axis $f'$. The disposition of the respective flexing connections, each composed of links $e, f$, is such that, when the joint or point of flexure $e'$ is depressed, the rear link $e$ is drawn forward with an increasing velocity, throwing the type-bar to the printing point with an accelerating movement. The several axes $f'$ are provided in the following manner.

Mounted between the frame side plates $g, g$, in rear of the bank of finger pieces, is an upright transverse plate or frame $h$ whose upper edge is a concave curve and flatter than that of the type-bar segment. Its front face from the edge downwardly has in it a series of vertical grooves $h'$ in which are seated vertically disposed posts $h^2$ clamped in place, in pairs, by circular washers held in position by the heads of screws $h^3$. To prevent the posts from turning and throwing the type bar actuating connections $e f$ out of line the posts are formed with flat faces upon which the clamping washers bear. On the front of face of plate $h$ is removably bolted a segmental plate 1 (Figs. 2 and 6) whose upper concave edge is stepped from each end to the center. The series of rests, stops or steps so formed, or otherwise provided, serve as bottom stops or gages for the series of posts $h^2$. Each post is shown as having a flat enlargement $h^4$ at the top and to it is attached, by a pivot connection, its corresponding front link $f$. All of the posts are so set that the several flexing connections $e, f$, viewed in plan, lie in vertical planes intersecting the axes $f'$ and points of connection of links $e$ with the type-bars (Figs. 1 and 8). When the parts are assembled they will naturally assume this straight line arrangement by reason of their self-strain or gravity, and then their supporting posts having been properly set down against the gage plate, may be clamped by turning up screws $h^3$.

As seen in Figs. 2 and 8, the transverse curve in which the several axes $f'$ lie has a longer chord than that of the type-bar segment, and is flatter than the curve in which the axes of the type-bars lie. As viewed in elevation, Fig. 8$^a$, straight lines connecting the points of flexure $e'$ with the points of connection of links $e$ with the type-bars converge upon a focus considerably beyond that at which they converge when viewed in plan as in Fig. 8: and, since the curve occupied by the axes $f'$ is considerably below the type-bar segment, lines passing through the various links $e$, as viewed in elevation Fig. 8$^a$, converge upon a focus at a greater elevation than that at which they appear to meet when viewed in plan as in Fig. 8. This general arrangement affords the described straight line pull, as viewed in plan, of the flexing connections upon their respective type-bars. Since, in any event, the curve in which the axes $f'$ lie is of greater radius than the curve in which the axes of the type-bars lie, it follows (assuming that the axes of the type-bars are all in the same vertical plane) that if the axes $f'$ are all in the same vertical plane the flexing connections would necessarily be of unequal length, their length gradually increasing from the center toward either side of the series. To permit of their being made of equal length, and to afford uniform length of all links $e$ and uniform length of all links $f$, the axes $f'$, are arranged as follows: As seen in plan view, Fig. 1, the series of axes $f'$ carried by plate $h$, occupy a transverse line having a slight curve, the convex side being toward the front of the machine, and plate $h$ is tilted or inclined from a vertical plane, its ends being thereby brought nearer the segment than its bottom or central part. This arrangement is indicated in Fig. 8$^a$ which shows the location of the axis $f'$ of the connection for operating one of the end type-bars, and that for operating one of the center type-bars. Since the distances between the axes $f'$ and the heels of the type-bars increases gradually from the center of the series toward either side, the distance between all of these points, may be made uniform by inclining plate $h$, the effect being to swing the axes $f'$ at the center of the series somewhat away from the segment, and those at and near the end of the series toward the segment, intermediate ones being similarly influenced, according to their position in the curve. All links $e$ being uniform are interchangeable. The same is true of links $f$ and posts $h^2$.

To obtain the best character of finger-piece or key touch in this style of machine the power for depressing the flexing connections $e, f$, is applied to them in substantially vertical lines lying in the vertical planes that pass through the flexing connections when viewed in plan as in Figs. 1 and 8. In the described organization, key-levers $d$ are employed for flexing the type-bar actuating connections. As shown they are arranged parallel in a series of a width equal to the transverse dimensions within which are included all the points of connection between the key-levers and the flexing connections, and since the front links $f$ are radially arranged their pivot points occupy a transverse space greater than the width of the series of key-levers. As seen in Figs. 5 and 9, each key-lever is connected by a link $i$ with the link $f$ immediately above it. The link $i$ (Figs. 5 and 5$^b$) has an eye or hook engaging an aperture in link $f$ (shown as made of flat sheet metal) and a snap hook $i'$ engaging an aperture in the key-lever. When the link $i$, as in Fig. 5, stands in a vertical line passing through the point, substantially, of intersection of its key-lever and link $f$, in some respects, the most satisfactory results are obtained. Slight variations, not departing from these principles of construction, do not create very material differences of conditions.

In the snap hook shown in Fig. 5$^b$, the spring plate is apertured and the end of the hook $i$ is straight so that it passes through and may play in the aperture of the spring plate. With this construction of the hook, any tendency of the part engaged by it to move to the end of the hook and become disengaged therefrom is overcome by the action of the spring plate. Experience has shown that this is a very efficient and desirable form of the device.

The drawings indicate a standard key-board having four transverse rows of finger pieces. The key-levers are as usual pivoted upon a common axis, there being four lengths of key-levers, one for each row of finger pieces. The key-levers represented in the respective rows of finger pieces are connected to links $f$ in such manner that a uniform, or substantially uniform depth of depression of all finger pieces will bring the type-bars to the printing point. The longer key-levers, whose finger-pieces are in the front row have their links $i$ connected to the corresponding links $f$ nearest the axes thereof, (Fig. 11). The key-levers represented in the next or second row of the key-board, being shorter, are connected to their corresponding links $f$, (Fig. 13) further from the axes thereof; those represented in the third row being still shorter are connected to their corresponding links still further from their axes, (Fig. 12); and those represented in the last row are connected to their corresponding links $f$ at still a greater distance from their axes, (Fig. 14). Substantially, the several lengths of key-levers are respectively connected at such distance from the axes of links $f$ that with a uniform depth of depression of all the finger pieces the corresponding type-bars are uniformly thrown to the printing point. This arrangement in itself affords uniform depth of depression of all finger pieces, and coupled with the described manner of connection of each key-lever with its corresponding link $f$, insures a light, substantially uniform, touch to all finger-pieces. The scheme of connection is shown in Fig. 1 where the points of connection to links $f$, as above described, of the four lengths of key-levers are correspondingly numbered 3, 4, 5, 6. In further explanation of this feature the several points of connection to links $f$ are numbered upon the single link $f$, shown in Fig. 5.

An arrangement of the reactionary springs of the type-bars is illustrated in Figs. 3, 4 and 5, Fig. 5, showing the preferred form. Above the plate $h$ (Figs. 3 and 4) is mounted a segmental angle bar $j$ from the horizontal part or flange of which extend coiled springs $j'$, having their lower ends attached to the links $f$ between their axes and the joints connecting them to rear links $e$. These springs viewed in front elevation, (Fig. 3) appear in parallel vertical lines, but viewed in side elevation (Figs. 5 and 10) they incline rearwardly to their points of connection with links $f$. The purpose of this disposition of the springs is to give them a decreasing leverage and thereby avoid undue increase of hardness of touch of the finger pieces during their depression. The tension of the springs may be adjusted by individual manipulation; or they may be adjusted by connecting their lower ends with different apertures $j^2$ a series of which may be formed in each link $f$ adjacent its upper edge, (Fig. 11). This invention, however, contemplates also simultaneous adjustment of a plurality or all of the springs located as described at the front of the machine above the links $f$. The means of accomplishing such adjustment may be very simple. The segmental plate $j$ is shown as mounted, to move vertically in guides, between the frame side plate $g$, $g$, and is made capable of vertical adjustment by means of screws $j^3$ swiveled in the ends of the plate and working in threaded apertures in blocks $j^4$ on the side plates. With this arrangement of springs, the key-levers $d$ are preferably pivotally mounted at their rear ends as follows (Figs. 1 and 5): The rear end of each key-lever is shown of increased width and has a key-way or slot $d'$ extending from its rear edge inwardly and at the inner end of the slot, the opening is enlarged in a circular curve $d^2$ of something more than half a circle. Extending through these openings $d^2$ is a pivoted bar $d^3$ appropriately mounted to turn in the side plates of the machine; and having two opposite faces flattened and the remaining opposite surfaces curved to conform to the circular curvature of the opening $d^2$. By turning the bar so that its flattened sides are horizontal, any or all key-levers may readily be withdrawn. When the flattened sides, however, stand vertically, the key-levers cannot be withdrawn, and its curved faces afford suitable bearings upon which the key-levers rock. The rear upper ends of the key-levers are guided in slots of a horizontally disposed comb plate $d^4$ extending from the back plate of the frame inwardly. $d^5$ indicates an ordinary universal bar. At the front, the key-levers fit and are guided in the slots of a vertically disposed comb plate $d^6$. If the reaction springs of the key-levers be applied to the latter adjacent their rear ends, as is sometimes done, the arrangement shown in Figs. 9 and 10 may be adopted. In this construction the several key-levers have upwardly opening bearings $k$ turning upon a fixed cylindrical rod $k'$ against which they are pressed by springs $k^2$ seated upon adjusting screws $k^3$ turning in the bottom of spring sockets formed in a transverse frame or bar $k^4$ rocking about axes $k^5$ and provided centrally with a downward rearward extension $k^6$ against which bears an adjusting screw $k^7$. On the front vertical face of the bar $k^4$ is attached a vertical comb plate $k^8$ in the slots of which the key-levers are guided. Adjustment of screw $k^7$ affords simultaneous adjustment of all the springs which have also individual adjustment by means of the screw bolts $k^3$. The various bolts $k^3$ may be locked by means of a wire bail $k^9$ pivoted in lugs $k^{10}$ on the under face of bar $k^4$ and held in locking position by the overlapping heads of screws $k^{11}$, the heads being however cut off on one side to afford clearance when the bail is to be swung out of the way.

The type-bar segment $c$ appropriately supported, for instance as shown in Fig. 2 by a cross bar $m'$ is formed with a segmental shoulder $m^2$ (Figs. 5 and 9 which show slight differences of form) an appropriate distance above the axes of the type bars, and from this shoulder the face of the main plate of the segment drops vertically to a lower segmental flange $m^3$ in which is formed a groove or recess for the reception of the wire passing through, and forming the pivots for all of the type-bars. The bearings of the type bars are closed by a segmental plate $m^4$ fitting over the shoulder $m^2$ above which its vertically disposed part $m^5$ is bolted to the main plate of the segment. The plate $m^4$ below the shoulder extends down vertically and closes, as seen in Fig. 9, the bearings of the type-bars above which both the main plate of the segment and the supplemental plate $m^4$ are slotted to permit the type bars to rock to the printing point on the platen. At, or about in line, with the shoulder $m^2$, the supplemental plate $m^4$ has a forwardly extending segmental rib or projection $m^6$. The type bars are notched or curved, or have in their upper faces a U-shaped depression $n$ into which the projection $m^6$ passes as the type bars come to the printing point. This projection affords a shield or guard projection over the slots in the segment and the bearings of the type bars and prevents access thereto of dirt and particles of paper and rubber that occur when erasures are made upon sheets in the machine.

The head rest for the type bars is shown in a variety of forms in various of the figures. For instance, that $b^3$ in Fig. 9 is different from that in Figs. 11 and 12; Fig. 11 showing a channel bar $b^4$ in the channel of which is seated a cushion $b^5$; while in Fig. 12 it is shown as a comparatively narrow plate $b^6$ upon which is seated a cushion $b^7$. The construction shown in Figs. 5 and 7 has material advantages in respect to avoidance of jars and noises of impact. It comprises a segmental channel iron $b^8$ in the groove of which is seated a strip of felt or other soft elastic material $b^9$, such, for instance as quite soft rubber—say "pure gum" of low degree of vulcanization. Upon such strip and out of contact with the flanges of the channel iron is a strip $b^{10}$ of yielding elastic material of a greater degree of hardness, and preferably vulcanized rubber of about the hardness and character employed for pencil erasures (although it may be considerably harder)—over which is laid a coating of thin material $b^{11}$ such as leather. The three strips or layers may be united by cement and be cemented in the channel of bar $b^8$. Experience has shown that with such a head-rest there is small tendency for the type-bars to rebound and little noise of impact.

The lower horizontal edge of the plate $h$ may, as shown, in various of the figures, serve as the upper stop of the key-levers and is, as indicated in some of the figures (Fig. 11) provided with a facing of rubber or other elastic or fibrous material $o$, two layers or strips being shown (Fig. 11) one of which may be felt and the other rubber. The arrangement shown in Figs. 5, 15 and 16 is, however, preferred. There, in lieu of pad $o$ of Fig. 11, is shown a toothed plate $o'$ is employed, the teeth $o^2$ of which lie, respectively, above the key levers, and are preferably bent rearwardly and doubled or turned over at the ends. The teeth are of sufficient rigidity to withstand the impact of return of the key-levers to normal position and yet, by means of a suitable tool may be bent forward or back to effect adjustment of the normal position of the key-levers. When this toothed stop plate is used the vertical guiding comb plate $d^6$ (Fig. 5) may be, and preferably is, employed.

Fig. 5 shows the preferred form of spring supporting segment. In this instance the segment $j^5$ has at its front edge a pendent flange $j^8$ formed with apertures for connection of the springs $j'$.

In Fig. 12 another arrangement of type bar reaction springs is indicated. In this instance, a spring $p$ connected at its rear end to a transverse bar $p'$ has its forward end connected to link $f$ below the hinge joint of the latter with link $e$. The rear end of the type bar adjacent its pivot is made of substantially greater width than in Fig. 11 to afford a greater bearing in the slot of the segment which latter is illustrated as of the same general construction already described although of somewhat different proportion.

In Fig. 13, the type bar reaction spring $q$ is shown as connected at its upper end to the type bar rest $b^6$ and at its lower end in one of a series of apertures in link $f$. This arrangement affords also a spring whose reaction has a decreasing leverage but the construction illustrated in Figs. 3 and 5 is preferred.

In Fig. 14, in addition to spring $j'$, a type bar reaction spring $r$ is connected to the heel of the type bar adjacent to and above the point at which link e is connected thereto. When a spring is applied to the heel of the type-bar I prefer the construction shown in Fig. 5. There a spring s is attached to the type-bar heel below and in rear of the connection thereto of link e, the pivot of the bar, connections of link e and spring s being in approximately an inclined line extending downward and rearward from the pivot. The purpose of this arrangement is to give long extension to the comparatively soft spring s or r, which has a decreasing leverage at the time the type-bar head is adjacent to or at the platen, the power of the spring being then relatively strong and serving to effect prompt return of the bar, and also to overcome any tendency it may have to stick in the type bar guide.

In an organization of type-bar operating links and key-levers such as described, strains exerted by the key-levers being vertical it is not of great importance that the latter be guided, and hence their fit within the comb plates $d^6$ and $d^4$ may be quite free or loose, the teeth of these plates acting primarily as spacing devices, rather than as key-lever guides.

Referring to Fig. 5, it will be noted that on the under sides of the key levers $d$, immediately over universal bar $d^5$ there is a lug or projection $d^7$. These projections vary in height according to the length of the key lever as will be seen by reference to Figs. 11, 12, 13 and 14, the longest key-lever having the highest lug and the shortest one the lowest lug, those of the levers of intermediate length being similarly proportioned in height. The general arrangement of anchor points $f'$ with reference to the key levers and the escapement let off is such that no additional adjustment other than that afforded by filing or bending (when necessary) the lugs is required to get a uniform result on the universal bar. It is also possible to obtain adjustment of the key-lever on the universal bar by raising or lowering the anchor points $f'$, which affects the angular arrangement of the links and in turn allows the vertical link $i$ to raise or lower the key levers. This, however, is not a desirable method to employ except, for cheapness of assembling, as the lowering and raising of the anchor points affects the depression of the key-levers and creates other slight inaccuracies in the construction.

A vibrator W is shown in Fig. 5. Its lower end is jointed to the long horizontal arm $x$ of a pivoted bell crank lever whose downwardly extending arm is jointed to a link $x'$ the front end of which is jointed to the vertically disposed end arm $x^2$ of a pivoted bell crank lever whose forwardly extending arm is shaped as shown in Fig. 5 and formed with three notches $x^3$, $x^4$, $x^5$ to receive a cross-piece or pin carried by a link $x^6$ connected centrally of the machine with the universal bar. When pin $x^7$ is in notch $x^3$ the range of movement of the ribbon vibrator is such that one only of the bands of color upon the ribbon (either red or black for instance) is brought opposite the printing point. When in notch $x^4$ the other band of color only is brought into operation, and when the pin is in notch $x^5$ no part of the ribbon is brought to the printing point. Link $x^6$ may be adjusted at will to any one of the three positions mentioned by means of a rocking arm $x^8$ having a vertical slot $x^9$ into which the cross pin $x^7$ extends, and operated upon by suitable shift keys or devices. When this arm is in its most forward position and cross pin $x^7$ is in notch $x^5$ an adjustable eccentrically mounted circular stop $x^{10}$ engages the rearwardly turned end $x^{11}$ of the horizontal forwardly extending end of the bell crank lever.

The rocking escapement plate $y$ is operated from arm $x^2$ of the bell crank lever by a link rod $y'$ (Figs. 5 and 5ª) that passes loosely through an aperture in the plate and has applied to its threaded end an elongated nut $y^2$ part of whose bore is of enlarged diameter and beyond which a lock nut $y^3$ is applied to the threaded end of the link rod. In this way the threaded part of the link rod is kept out of contact with the walls of the aperture in the plate.

The devices above described and shown in Fig. 5 for operating the ribbon vibrator and escapement are disclosed and claimed in my application No. 287,489, filed November 15, 1905.

The herein described arrangement for protecting the pivots of the type bars from dirt or erasure is broadly claimed in an application filed by me June 30, 1903, No. 163,691.

I claim as my invention:

1. A front stroke writing machine comprising the combination of the series of type bars, a series of forwardly extending links of uniform length respectively attached to the type bars, a series of shorter links of uniform length hinged to the series of first named links and respectively rocking about fixed axes in front of such hinges, and means for depressing the links of the last named series to thereby throw the corresponding type bars to the printing point with an increasing velocity.

2. A front stroke writing machine comprising the combination of the series of type bars, a series of links of uniform length connected to the type bars and extending toward the front of the machine, a second series of shorter links of uniform length hinged at their rear ends to the forward ends of the first named links and extending toward the front of the machine, a series of fixed posts of uniform dimensions to which the forward ends of the series of shorter links are hinged, and means for depressing the latter links to throw the corresponding type bars to the printing point with an increasing velocity.

3. A front stroke writing machine comprising the combination with the platen, segment and the series of type bars mounted in the segments and normally lying toward the front of the machine, flexing connections one for each type bar each composed of a long and short link united by a hinge joint the rear end of the long link being connected to its corresponding type bar and the front end of the short link to a fixed point in front of the hinge connection between the two links, the respective fixed points being so located with reference to the corresponding type bars that the flexing connections extending from the various fixed points to the type bars are of uniform length.

4. A front stroke writing machine comprising the combinations with the platen, segment and the series of type bars normally lying toward the front of the machine, of a flexing connection for each type bar extending from the type bar toward the front of the machine and composed of a long and short link united by a hinge joint, an anchor plate mounted at the front of the machine, a series of upright posts one for each flexing connection mounted upon the anchor plate and to each of which its corresponding flexing connection is united by a hinge joint, the anchor plate being disposed at such inclination to a vertical line that the various flexing connections are all of uniform length, and means for depressing such flexing connections to throw the corresponding type bars to the printing point with an increasing velocity.

5. In a front stroke writing machine of the general character described comprising the combination of an anchor plate $h$, a series of upright posts detachably connected to the anchor plate and each having means for a pivotal connection thereto, the whole series being arranged in a transverse concave line, and type bar operating connections one for each type bar pivoted to such posts and operatively connected with their corresponding type bars.

6. A typewriting machine of the character described comprising the combination of the segmental anchor plate $h$, a series of posts detachably connected thereto, and a post gage associated with the anchor plate and having a gaging surface for determining the correct position of each of said posts.

7. A writing machine of the general character described comprising the combination of the series of type bars, flexing type bar operating connections one for each type bar extending from the heel of the type bar under it toward the front of the machine and each composed of two links united by a hinge joint, fixed points to which the forward ends of such type bar operating connections are flexibly attached, such fixed points being arranged in a transverse concave curved line with those at the ends of the series nearer a vertical plane passing through the axes of the type bars than are those at the center of the series whereby, as described, the various flexing type bar operating connections may be of uniform length.

8. A front stroke writing machine comprising the combination of the type bar segment, the series of type bars mounted therein and normally lying toward the front of the machine, type bar operating connections one for each type bar each composed of a forwardly extending link operatively connected to the type bar and a shorter forwardly extending link swinging about a fixed point, a series of springs one for each short link connected at their lower ends to their corresponding links in rear of the fixed points, a segmental spring supporting plate to which the upper ends of the springs are connected and means for adjusting the position of the plate to simultaneously vary the tension of all the springs.

9. A front stroke writing machine comprising the combination of the type bars, operative connections each composed of two links hinged together, a rear link attached to its corresponding type bar and a shorter front link swinging about a fixed point on the frame, a series of key levers one for each such connection arranged below them and of unequal length, the length thereof being determined by the position of the finger pieces in the key-board and link connections between the key levers and said shorter front links, such link connections being attached to the shorter front links at different distances from their fixed points such distance being determined in each case by the length of the key lever.

10. A writing machine of the general character described comprising the combination of the short front links $f$ respectively turning about fixed points at their front ends, a series of key levers arranged below such links rocking about a common axis and of dissimilar length, and connections between the respective key levers and corresponding links, the points of connections with the links being at different distances from the fixed points of the latter according to the lengths of the key levers whereby substantially uniform depth of depression of the various key levers is obtained.

11. A writing machine of the general character described comprising the combination of the type bar segment, type bars pivoted therein and normally extending toward the front of the machine, a series of rearwardly extending links, a series of fixed points to which the front ends of such links are pivoted, the series of pivots being arranged in a concave transverse line having a longer chord than that of the curve in which the type bars are pivoted and located correspondingly below such curve, a series of longer links respectively hinged at their front ends to the rear ends of the short links, and extending upwardly and rearwardly to the heels of their respective type bars, key levers one for each type bar having a common axis, extending forward under the short front links and of unequal length according to their respective positions in the key board, and a link connection from each key lever to its corresponding short front link such connections being at different distances from the axes of the short front links according to the lengths of the key levers.

12. In a front stroke writing machine, the combination with the segment and series of type bars pivoted therein, of type bar operating connections one for each type bar hinged at the rear to the type bars and at the front to fixed points, such connections having hinge joints in rear of the fixed points and acting as braking or accelerating toggles, key-levers of unequal length, operative connections between the key levers and type bar operating connections applied to the latter between their hinge joints and fixed points at variable distances from such points according to the length of the key levers.

13. A typewriting machine comprising pivoted type bars, flexing type bar operating connections attached at their rear ends to the type bars, a series of upright members arranged in front of the type bar pivots and to which the front ends of such connections are attached and gages for determining the positions of said members.

14. A typewriting machine comprising pivoted type bars, flexing type bar operating connections attached at their rear ends to the type bars, a series of upright members arranged in front of the type bar pivots and to which the front ends of such connections are attached and a notched gage-plate for determining correct position of said members.

15. A typewriting machine comprising a series of flat type bar operating members each horizontally disposed, pivoted at their front ends, having means for attachment of links at their rear ends, means for attachment of the downwardly extending links at variable distances from their pivots and means for attachment of variable leverage springs at variable distances from their pivots.

16. A writing machine comprising the combination of a series of type bars; a series of conically arranged links under the type bars and attached thereto at their rear ends; a series of radially arranged shorter links pivoted at their front ends and hinged at their rear ends to the first named links; and a series of vertically disposed links attached at their upper ends to said shorter links at different distances from their pivots; a series of horizontally arranged parallel key levers of different lengths to which the lower ends of the upright links are attached, the key levers lying, respectively, in line below the points of connection of the upright links with said shorter links.

17. In a writing machine having type bars normally extending to the front of the machine, a channeled support adapted to hold a pad upon which the type bars rest, and a pad seated therein and composed of a layer of relatively soft and elastic material, an outer layer of relatively hard material and a relatively thin cover applied over the outer layer.

18. A segmental channeled type bar rest support and a pad seated therein and composed of relatively elastic material in contact with the support and an outer relatively inelastic material out of contact with the support upon which the heads of the type bars lie.

19. A typewriting machine comprising the combination of type-bars, four series of key levers, those of each series being of equal length, type bar operating flexing connections, each comprising two links of unequal length, all the shorter ones being of uniform length and all the longer ones being likewise of uniform length, and vertically disposed links connecting all said shorter links with their respective type bars.

20. A typewriting machine comprising the combination of type-bars, four series of key levers, those of each series being of equal length, type bar operating flexing connections, each comprising two links of unequal length, all the shorter ones being of uniform length and all the longer ones being likewise of uniform length, and vertically disposed links connecting all said shorter links with their respective key levers, the connections of the vertically disposed links being made at different points on said shorter links according to the different lengths of key levers.

21. In a front stroke writing machine, a series of type bars of equal length, a series of type bar actuating flexible connections each composed of a shorter front link and longer rear link hinged thereto, all the shorter links being of equal length and all the longer links being of uniform length, a series of vertically disposed links of unequal length operatively applied to such flexing connections intermediate their front and rear ends and a series of key levers of four different lengths to which the latter links are connected.

22. A front stroke writing machine, comprising the combination of a series of parallel horizontally disposed key levers extending fore and aft the machine, a series of parallel type bars normally lying toward the front of the machine in trough-like formation and above the key levers, a series of convergent flexing type bar actuating connections of equal length lying between the type bars and key levers, and each composed of two links hinged together and connected at the rear to its type bar and at the front pivoted at a fixed point; the transverse line in which the fixed pivot points are included being of greater length than the width of the series of key levers, and vertically disposed links connecting each key lever with its corresponding flexing connection in rear of the front pivot point of the latter.

23. A front stroke writing machine comprising the combination of a decreasing leverage link lying in a substantially horizontal position, a link inclined obliquely upward therefrom and hinged to its rear end, the two forming a flexing connection attached at its rear end to the type bar and pivoted at its front end to a fixed point, and means operating upon the flexing connection intermediate its ends to flex the connection and move the point of flexure forward during the rearward excursion of the type bar to the printing point.

24. A front stroke writing machine of the character described, comprising a series of anchor or pivot points, for type bar actuating connections and a series of key levers located below such points, the series of anchor points being included in a transverse line of greater length than the width of the series of key levers.

25. A typewriting machine comprising a series of key levers, a series of decreasing leverage type bar actuating members and a series of decreasing leverage springs therefor, combined with vertically arranged connections attached to the key levers and engaging the decreasing leverage members at various points, according to the positions in the key board occupied by the key-levers.

26. A writing machine comprising a series of decreasing leverage, type-bar actuating members, a series of decreasing leverage springs applied thereto and means for simultaneously adjusting all the springs.

27. A typewriting machine comprising a two piece type-bar segment the rear portion of which is slotted at its lower end to receive the type-bars therein mounted and also slotted to receive the pivot rod for the type-bars and the front portion of which is also slotted to receive type-bars and also acts to retain the pivot bar in position and as a dust or dirt shed.

28. A type bar segment comprising a plurality of separate segmental parts fitted together, the segment being provided with radial slots to receive the type bars, and the contiguous faces of the segmental parts being adapted to receive and support the pivots about which the type bars rock.

29. A type bar segment composed of two segmental parts fitted together and provided with slots extending into both parts to receive the type bars, a continuous aperture in the segment adapted to receive a pivot wire, common to all the type bars, which is supported and held in position by the two segmental parts.

30. A type bar segment composed of two segmental parts fitted together and provided with radial slots, extending into both parts, to receive the type bars, one part being formed to receive the type bar pivots and the other to hold them against displacement.

31. A type bar segment composed of two segmental parts fitted together and provided with radial slots, extending into both parts, to receive the type bars, one part being formed to receive a continuous wire constituting the pivot for all the type bars and the other acting to hold the wire against displacement.

32. A type bar segment composed of two segmental parts, one removably fitted upon the other, and having radial slots extending into both parts, to receive the type bars, the contiguous segmental faces of the two parts being adapted to receive and support the type bar pivots, and the removable part having a segmental extension acting as a dust guard to protect the pivots of the bars.

In testimony whereof, I have hereunto subscribed my name.

EDWARD B. HESS.

Witnesses:
  EDWARD C. DAVIDSON,
  L. F. BROWNING.